US007908310B2

(12) United States Patent
Lin

(10) Patent No.: US 7,908,310 B2
(45) Date of Patent: Mar. 15, 2011

(54) MULTIPLIER-DIVIDER HAVING ERROR OFFSET FUNCTION

(75) Inventor: Kuo-Fan Lin, Taoyuan Hsien (TW)

(73) Assignee: FSP Technology Inc., Taoyuan, Taoyuan Hsien (TW)

( * ) Notice: Subject to any disclaimer, the term of this patent is extended or adjusted under 35 U.S.C. 154(b) by 1042 days.

(21) Appl. No.: 11/714,764

(22) Filed: Mar. 7, 2007

(65) Prior Publication Data

US 2008/0222230 A1 Sep. 11, 2008

(51) Int. Cl.
*G06F 7/16* (2006.01)
*G05F 5/00* (2006.01)

(52) U.S. Cl. .......................................... 708/843; 323/207

(58) Field of Classification Search .................. 708/835, 708/843; 323/207

See application file for complete search history.

(56) References Cited

U.S. PATENT DOCUMENTS

| | | | | |
|---|---|---|---|---|
| 5,960,207 | A * | 9/1999 | Brown | 713/300 |
| 6,744,241 | B2 * | 6/2004 | Feldtkeller | 323/207 |
| 6,812,769 | B1 * | 11/2004 | Yang et al. | 327/355 |
| 7,057,440 | B2 * | 6/2006 | Yang et al. | 327/355 |
| 7,400,517 | B2 * | 7/2008 | Allinder | 363/21.05 |

* cited by examiner

*Primary Examiner* — Chuong D Ngo
(74) *Attorney, Agent, or Firm* — Winston Hsu; Scott Margo

(57) ABSTRACT

A multiplier-divider capable of offsetting errors includes a plurality of multiplication and division units to perform processes and arrangements so that errors generated by signals passing through the multiplier-divider are offset. As a result impact of the errors is reduced. More than one processing signal can be obtained from the same power supply to reduce loss of external sampling.

28 Claims, 3 Drawing Sheets

MULTIPLIER-DIVIDER HAVING ERROR OFFSET FUNCTION

FIELD OF THE INVENTION

The present invention relates to a multiplier-divider capable of offsetting errors and particularly to a multiplier-divider adopted for use on a power factor correction (PFC) circuit of power supplies.

BACKGROUND OF THE INVENTION

Multiplier-divider is widely used on modern electronic devices. It aims to generate an output signal proportional to two or more input signals. The output signal may be voltage or current. One of the common applications of the multiplier-divider is on a PFC circuit to generate a control signal through an input current, a feedback signal and an input voltage.

These days safety regulations and power saving requirements are increasingly strict. Hence power supply usually has to equip with a PFC circuit to reduce resonance wave and regulate current phase to be close the voltage phase to improve power utilization efficiency. The conventional passive PFC circuit can improve the efficiency only about 70%, while the active PFC circuit can improve the power utilization efficiency above 80%. Hence the active PFC circuit becomes a necessary element for all almost types of power supplies in the future. The active PFC circuit can be divided into a discontinuous current mode and a continuous current mode. The continuous current mode is more suitable for the power supply with power output greater than 300 W, thus is the main R & D focus in the industry. The PFC circuit adopted the continuous current mode generates a control signal through a multiplier-divider to set current ON so that the continuous current forms an average current close to the output voltage phase. Therefore the multiplier-divider is an important and necessary circuit in the continuous current mode.

U.S. Pat. No. 7,057,440 entitled "Multiplier-divider circuit for a PFC controller" has two multiplier-divider units coupled in series and a pulse generator to regulate operation of the multiplier-divider units. Each multiplier-divider unit includes a charge time control circuit, a linear charge circuit and a sample circuit. It receives input of a first multiplier signal, a second multiplier signal and a divisor signal. It also has a current source to provide a selected current as the basis of gain. Output can be calculated according the following equation:

$$Vo \propto I_R\left(\frac{I_{AC} \times V_E}{V_{AC}^2}\right)$$

In the cited reference mentioned above, the multiplier-divider unit generates a charge signal $V_{CHG}$ through the first multiplier signal $V_E$ and a saw-tooth signal $V_{SAW}$. The saw-tooth signal $V_{SAW}$ is generated by the divisor signal $V_{AC}$. Moreover, the saw-tooth signal $V_{SAW}$ is transformed by a current I1 generated by the divisor signal $V_{AC}$. But the current source of the divisor signal $V_{AC}$ that generates the current I1 has resistance (marked by numeral 122 in the drawings of the cited reference). Since an error occurs between two the integrated circuits due to different manufacturing processes, a difference occurs between the resistor 122 of the current source and the external resistance that causes a manufacturing variation while the current I1 is generated and passes through the resistor 122. As the divisor signal $V_{AC}$. is generated by the current I1, it also contains an error resulting from the manufacturing variation. The error is proportional to the divisor signal $V_{AC}$. As a result, output generated by the cited reference has an error of $1/m^2$ due to variations of temperature and manufacturing process. Such an error causes the multiplier-divider used on the active PFC circuit in the continuous current mode to regulate the current phase cannot increase the efficiency to a designed value. There is still room for improvement.

SUMMARY OF THE INVENTION

In view of the aforesaid problem occurred to the conventional technique that has error caused by variations of temperature and manufacturing process, the primary object of the present invention is to provide a multiplier-divider that can execute multiplication and division, and also can offset the aforesaid error to reduce the effect caused by the error so that the calculation result is closer to the desired value.

The invention provides a multiplier-divider capable of offsetting errors. It includes a buffer, a resistor, three sets of differential converters, two dividers, two multipliers and a pulse generator. Each multiplier has a peak detector and a voltage integrator with the period controlled by the divider. Each divider has two waveform generators which form independent dividers function wise, and have the structure passing through the multipliers at a next stage through the period. The pulse generator has two bar gate units and a square wave generator to isolate waveform and reset the bar gate units. By means of the elements set forth above, an embodiment circuit of the invention can be formed. Through the linear relationship of voltage and charges of a capacitor as follow:

$$V_C = \frac{I \times t}{C}$$

The following equation can be derived:

$$t = \frac{V_C \times C}{I}$$

Based on the two basic equations set forth above, I and t are connected to two input ends of the multipliers to get Vc. With Vc and I as inputs of the dividers a t-shaped output can be obtained. Thus multiplication and division calculation can be performed by the multiplier-divider through the relationship between the voltage, current and period.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
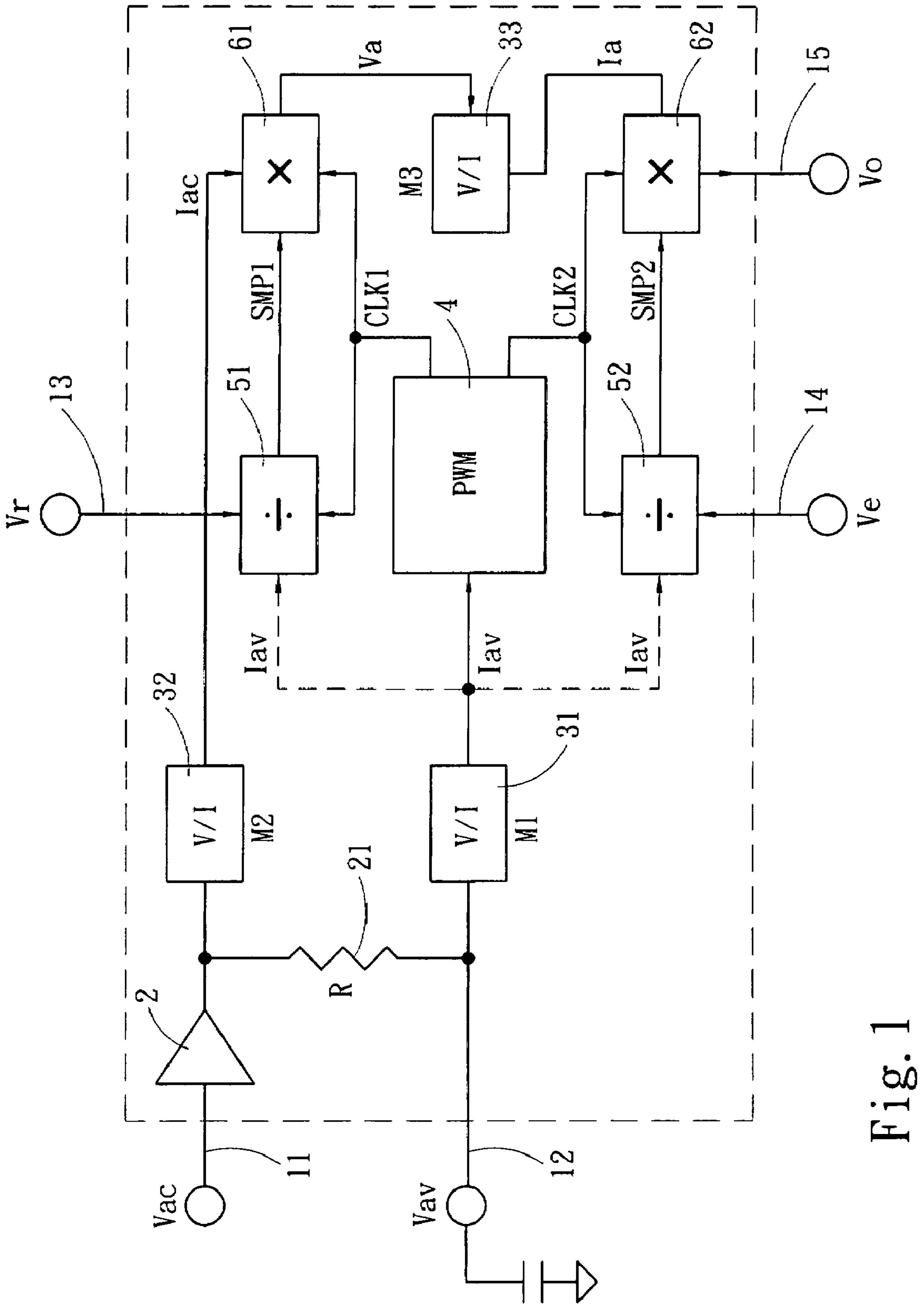
FIG. 1 is a circuit block diagram of the invention.

Please refer to FIG. 1 for a circuit block diagram of the invention. The circuit includes a multiplier input terminal 11, a first divisor input terminal 12, a second divisor input terminal 13 and a third divisor input terminal 14 to receive respectively a first multiplier signal Vac, a first divisor signal Vav, a second divisor signal Vr and a third divisor signal Ve, and an output terminal 15 to output process result. There is a first differential converter 31 which and the multiplier input terminal 11 are interposed by a buffer 2. The buffer 2 has an output end which and the first divisor input terminal 12 are bridged by a resistor 21 in a straddle manner. The first divisor input terminal 12 further is connected to a capacitor. The first multiplier signal Vac forms the first divisor signal Vav on the capacitor. Thereby the first multiplier signal Vac charges the capacitor to get the first divisor signal Vav, sampling loss can be reduced. The multiplier-divider of the invention further includes the first differential converter 31, a second differential converter 32, a third differential converter 33, a pulse generator 4, a first multiplication unit 61 and a second multiplication unit 62. The first differential converter 31 receives the first divisor signal Vav and divides the current to output a plurality of divisor conversion signals Iav. The second differential converter 32 receives the first multiplier signal Vac and outputs at least one multiplier conversion signal Iac. The pulse generator 4 receives one of the divisor conversion signals Iav to generate a first pulse signal CLK1 and a second pulse signal CLK2 that are output through a first pulse output end and a second pulse output end. The first division unit 51 receives one divisor conversion signal Iav, second divisor signal Vr and first pulse signal CLK1 to execute division and output a first quotient signal SMP1. The first multiplication unit 61 receives the first quotient signal SMP1 and multiplier conversion signal Iac output from the second differential converter 32 and the first pulse signal CLK1 to calculate the product of the first quotient signal SMP1 and multiplier conversion signal Iac and output a first product signal Va. The third differential converter 33 receives the first product signal Va and converts to output a product conversion signal Ia. The second division unit 52 receives another divisor conversion signal Iav, third divisor signal Ve and second pulse signal CLK2 and processes and outputs a second quotient signal SMP2. The second multiplication unit 62 further receives the product conversion signal Ia output from the third differential converter 33, the second quotient signal SMP2 and the second pulse signal CLK2 to form an output signal Vo resulting from multiplication of the product conversion signal Ia and the second quotient signal SMP2. The first differential converter 31, second differential converter 32 and third differential converter 33 convert voltage to current according to a selected ratio. As the first differential converter 31, second differential converter 32 and third differential converter 33 are produced through a same manufacturing process, they have a same error coefficient. In the process of generating the output signal Vo, the divisor conversion signals Iav generated by the first differential converter 31 go through two division processes through the first division unit 51 and second division unit 52 that accumulate two times of errors to form a division error. The multiplier conversion signal Iac generated by the second differential converter 32 passes through the first multiplication unit 61 to generate the first product signal Va. The first product signal Va is converted to the product conversion signal Ia through the third differential converter 33. Hence the first multiplier signal Vac also goes through the second differential converter 32 and the third differential converter 33 to accumulate two times of errors to form one multiplication error. Hence in the second multiplication unit 62 the product conversion signal Ia and the second quotient signal SMP2 are multiplied to offset the accumulated error coefficients resulting from two times of divisions and multiplications. As a result the output signal Vo is not affected by the error coefficients.

Figure 2:
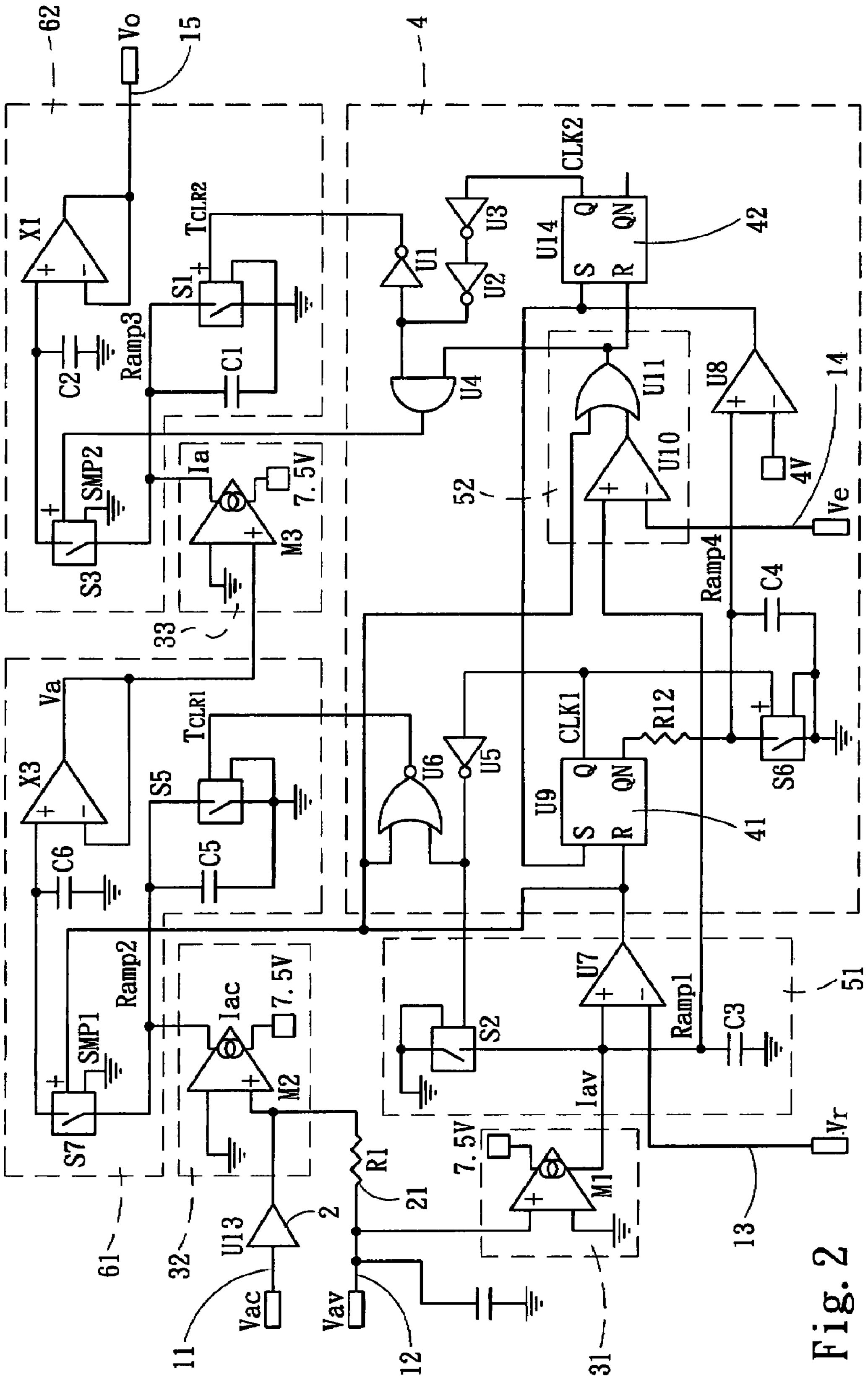
FIG. 2 is a circuit diagram of an embodiment of the invention.
Figure 3:
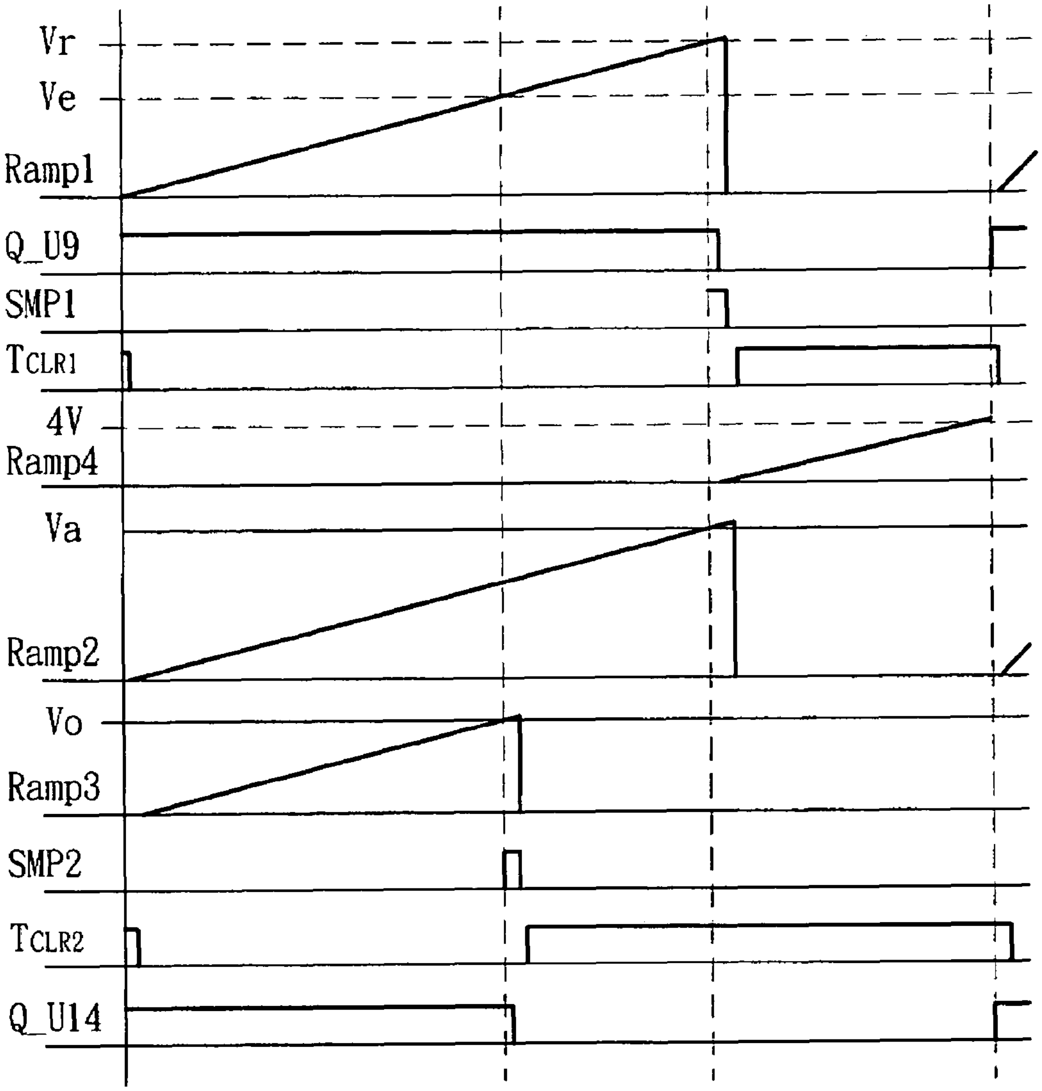
FIG. 3 is a chart showing the waveform on selected nodes of the embodiment circuit.

Refer to FIGS. 2 and 3 for an embodiment circuit and a waveform chart on various nodes thereof. The first multiplier signal Vac passes through the buffer 2 and is sent to the second differential converter 32 to form the multiplier conversion signal Iac. The buffer 2 has the rear end connecting to the resistor 21 in a straddle manner and the first divisor input terminal 12. The first divisor input terminal 12 is connected to a capacitor to form the first divisor signal Vav. The first divisor signal Vav is input to the first differential converter 31 to form the divisor conversion signal Iav. The divisor conversion signal Iav and the second divisor signal Vr are input to the first division unit 51. The first division unit 51 includes a linear charge circuit consisting of a circuit switch S2 and a capacitor C3 and a square wave generator consisting of a comparator U7. The divisor conversion signal Iav charges the capacitor C3 during the OFF period of the switch S2. The comparator U7 has two input ends connecting to the capacitor C3 and the second divisor signal Vr. Through the linear charge circuit a saw-tooth voltage is formed and input to the square wave generator of the first division unit 51 to be compared with the second divisor signal Vr. When the peak voltage of the capacitor C3 is higher than the second divisor signal Vr, the comparator U7 outputs a high level. Output of the first division unit 51 is substantially same as a time period obtained by division process of the second divisor signal Vr and the divisor conversion signal Iav. The second division unit 52 includes an OR gate U11, an AND gate U4 and a comparator U10. The comparator U10 receives a current component of the divisor conversion signal Iav and the third divisor signal Ve. Similarly, a time period is obtained by comparing the divisor conversion signal Iav and the third divisor signal Ve and performing a division process. Through the OR gate U11 and AND gate 4, it is input to the second multiplication unit 62. The pulse generator 4 includes a first bar gate unit 41 and a second bar gate unit 42. The first bar gate unit 41 and second bar gate unit 42 may consist of two SR-flip flop. The input and output relationship of the first bar gate unit 41 and second bar gate unit 42 is a technique known in the art, thus details are omitted hereinafter. The division unit 51 and second division unit 52 have output linking respectively to an input of the first bar gate unit 41 and second bar gate unit 42. In cooperation with the output of the first division unit 51 and second division unit 52, the first bar gate unit 41 and second bar gate unit 42 have one output end delivering the first pulse signal CLK1 and second pulse signal CLK2. The first bar gate 41 and second bar unit 42 further are interposed by a period restriction circuit. The period restriction circuit includes a linear charge circuit consisting of a switch S6 and a capacitor C4, a comparator U8 and a voltage source. The period restriction circuit has the output linking to another input end of the first bar gate unit 41 and second bar gate unit 42. The charging time of the period restriction circuit is controlled by the first pulse signal CLK1. When the voltage of the capacitor C4 of the period restriction circuit is higher than the voltage source a pulse is output to make the first pulse signal CLK1 and second pulse signal CLK2 to become a lower level. The first pulse signal CLK1 passes through a NOT gate U5 to control the switch S2 of the linear charge circuit of the first division unit 51, thereby to control the operation sequence of the first division unit 51. The first pulse signal CLK1 passes through the NOT gate U5 and a NOR gate U6 to be linked to the first multiplication unit 61. The first multiplication unit 61 includes a peak detector and a voltage integrator. The voltage integrator includes a switch S5 and a capacitor C5. ON/OFF of the switch S5 is controlled by the first pulse signal CLK1. The capacitor C5 is connected to the second differential converter 32. The capacitor C5 performs charging through the multiplier conversion signal Iac during the first pulse signal CLK1 is at a low level. The peak detector includes a sampling switch S7, a capacitor C6 and a comparator X3. When the first quotient signal SMP1 output from the first division unit 51 is at a high level, the sampling switch S7 of the peak detector is ON. For the first multiplication unit 61 the first quotient signal SMP1 is substantially same as a time period to be multiplied with the current. The peak detector takes voltage samples of the integration performed by the voltage integrator to make the capacitor C6 to be charged at the same voltage level of the capacitor C5. Meanwhile, the first bar gate unit 41 also outputs the first pulse signal CLK1 to set the sampling switch S7 OFF when charging of the capacitor C6 is finished through the delay of the NOT gate U5 and NOR gate U6. Thereafter the switch S5 is ON to allow the capacitor C5 to perform discharging. Thereby the capacitor C6 can maintain a voltage peak value for the multiplier conversion signal Iac to charge the capacitor C5 during the first pulse signal CLK1 at a low level to form a multiplication effect to output a first product signal Va. The first product signal Va is linked to the third differential converter 33 to be converted to a product conversion signal Ia to be sent to the second multiplication unit 62. The second multiplication unit 62 also has a peak detector and a voltage integrator which consists of a switch S1 and a capacitor C1. The second pulse signal CLK2 passes through three NOT gates U1, U2 and U3 and is linked to the switch S1 to control ON and OFF of the switch S1. When the switch S1 is OFF the product conversion signal Ia charges the capacitor C1. The peak detector includes a sampling switch S3, a capacitor C2 and a comparator X1. When the second quotient signal SMP2 output by the second division unit 52 is at a high level, by cooperating with the second pulse signal CLK2 which also is at a high level, the AND gate U4 can output a high level to set the sampling switch S3 ON. The peak detector takes a voltage sample integrated by the voltage integrator so that the capacitor C2 keeps the capacitor C1 at a voltage peak value. Then the sampling switch S3 is set OFF, and the switch S1 is ON to make the capacitor C1 to perform discharging. The peak voltage of the capacitor C2 makes the comparator X1 to generate the output signal Vo to finish the whole multiplication and division processes.

The processes previously discussed adopt the following equations:

$$Iav=Vav\times M1 \tag{1}$$

$$Iac=Vac\times M2 \tag{2}$$

$$Ia=Va\times M3 \tag{3}$$

where M1, M2 and M3 are conversion coefficients of the first differential converter 31, the second differential converter 32 and the third differential converter 33. Presume that the gain of the second differential converter 32 is same as the third differential converter 33, the following condition may be set:

$$M2=1X\ M3=1X\ M1=(\pi/2)X$$

where X is an error coefficient of the differential converter, the constant of M3 is set π/2 so that the calculation result can become the set constant.

based on the formulas as follow:

$$V_C=\frac{I\times t}{C} \text{ and } t=\frac{V_C\times C}{I},$$

The following can be derived:

$$T_{CLR1}=\frac{Vr\times C3}{Iav} \tag{4}$$

and $$Va=\frac{Iac\times T_{CLR1}}{C5} \tag{5}$$

where TCLR1 is the charge time of Iac to C5, by putting (4) into (5), the following can be derived:

$$Va=\frac{Iac\times Vr\times C3}{C5} \tag{6}$$

$$T_{CLR2}=\frac{Ve\times C3}{Iav} \tag{7}$$

$$Vo=\frac{Ia\times T_{CLR2}}{C1} \tag{8}$$

where TCLR2 is the charge time of Ia to C1, by putting (3), (6) and (7) into (8), the following can be derived:

$$V_O=\frac{M3\times M2\times C3^2}{C1\times C5\times M1^2}\times\frac{Vr\times Vac\times Ve}{Vav^2} \tag{9}$$

In the condition of M2=M3=1X M1=(π/2)X, where X is the error coefficient of the differential converter, by putting in $Vav=(2\sqrt{2}/\pi)\times Vrms$, where Vrms is the average square root value of the first multiplier signal Vac, the following can be derived:

$$Vo=\frac{0.5\times Vr\times Ve\times Vac}{Vrms^2}$$

In the equation of Vo, as the conversion coefficients M2 and M3 of the second differential converter 32 and the third differential converter 33 are numerators, and the denominator is the square of the conversion coefficient M1 of the first differential converter 31, the error coefficient X of M1, M2 and M3 can be offset. As a result, all the variables M1, M2, M3, C1, C3 and C5 that relate to the manufacturing process or temperature are offset. Thus the error resulting from temperature coefficient and manufacturing process can be offset.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A multiplier-divider having error offset function including a multiplier input terminal, a first divisor input terminal, a second divisor input terminal and a third divisor input terminal to receive respectively a first multiplier signal, a first divisor signal, a second divisor signal and a third divisor signal, and an output terminal to output process results, the multiplier-divider comprising:

a first differential converter to receive and divide the first divisor signal and output a plurality sets of divisor conversion signals;

a second differential converter to receive the first multiplier signal and output at least one multiplier conversion signal;

a pulse generator to receive one of the divisor conversion signals to generate a first pulse signal and a second pulse signal that are output respectively through a first pulse output end and a second pulse output end;

a first division unit to receive another one of the divisor conversion signals, the first pulse signal and the second divisor signal and perform processing to generate a first quotient signal;

a second division unit to receive yet another one of the divisor conversion signals, the second pulse signal and the third divisor signal and perform processing to generate a second quotient signal;

a first multiplication unit to receive the multiplier conversion signal, the first pulse signal and the first quotient signal and perform processing to generate a first product signal;

a third differential converter to receive the first product signal and output at least one product conversion signal; and a second multiplication unit to receive the product conversion signal, the second pulse signal and the second quotient signal and perform processing to generate an output signal;

wherein the divisor conversion signals generated by the first differential converter during the processing form a division error after two times of division processing, the multiplier conversion signal generated by the second differential converter and the product conversion signal generated by the third differential converter go through respectively one multiplication processing to form a multiplication error, a product error generated by the second multiplication unit resulting from the second differential converter and the third differential converter offsets the division error generated by the first differential converter such that the errors are offset in the output signal.

2. The multiplier-divider of claim 1, wherein the multiplier input terminal and the first differential converter are interposed by a buffer, the buffer having an output end which and the first divisor input terminal being bridged by a resistor in a straddle manner, the first divisor input terminal being connected to a capacitor, the first divisor signal being formed on the capacitor through the first multiplier signal to reduce sampling loss.

3. The multiplier-divider of claim 1, wherein the first division unit receives the divisor conversion signal and the second divisor signal and has a first square wave generator to convert a first comparison outcome of both signals to the first quotient signal.

4. The multiplier-divider of claim 1, wherein the second division unit receives the divisor conversion signal and the third divisor signal, and has a second square wave generator to convert a second comparison outcome of both signals to the second quotient signal.

5. The multiplier-divider of claim 1, wherein the pulse generator includes a first bar gate unit and a second bar gate unit that have respectively two input ends and two output ends, one of the input ends of the first bar gate unit and the second bar gate unit receiving respectively the first quotient signal and the second quotient signal, the other input ends of the first bar gate unit and the second bar gate unit being connected to a period restriction circuit, one of the output ends of the first bar gate unit and the second bar gate unit generating respectively the first pulse signal and the second pulse signal, the other output ends of the first bar gate unit and the second bar gate unit outputting an output level inverse to the first pulse signal and the second pulse signal.

6. The multiplier-divider of claim 5, wherein the period restriction circuit includes a linear charge circuit, a voltage source and a square wave generator.

7. The multiplier-divider of claim 6, wherein the linear charge circuit includes a switch and a capacitor, the switch having a time sequence in an ON condition inverse to a high level and a low level of the first pulse signal.

8. The multiplier-divider of claim 5, wherein the period restriction circuit has an output end connecting to the first bar gate unit and the second bar gate unit, and a high level output to convert the first pulse signal and the second pulse signal to a low level.

9. The multiplier-divider of claim 5, wherein the output end of first bar gate unit output the first pulse signal is connected to a NOT gate and a NOR gate.

10. The multiplier-divider of claim 5, wherein the output end of second bar gate unit output the second pulse signal is connected to three NOT gates.

11. The multiplier-divider of claim 1, wherein the first differential converter and a first square wave generator of the first division unit are interposed by a linear charge circuit to form a saw-tooth voltage to be input to the first square wave generator of the first division unit to be compared with the second divisor signal.

12. The multiplier-divider of claim 11, wherein the linear charge circuit has a switch, ON or OFF of the switch being controlled by the first pulse signal, charging or discharging of the linear charge circuit being controlled by the switch.

13. The multiplier-divider of claim 11, wherein the linear charge circuit forms a saw-tooth voltage to be input to a second square wave generator of the second division unit to be compared with the third divisor signal.

14. The multiplier-divider of claim 1, wherein the first multiplication unit includes a peak detector and a voltage integrator.

15. The multiplier-divider of claim 14, wherein the peak detector includes a sampling switch, a capacitor and a comparator.

16. The multiplier-divider of claim 15, wherein the sampling switch has an ON period controlled by the first quotient signal output from the first division unit.

17. The multiplier-divider of claim 14, wherein the voltage integrator includes a capacitor and a switch, the capacitor being connected to the multiplier conversion signal to be charged, ON and OFF of the switch being controlled by the first pulse signal.

18. The multiplier-divider of claim 17, wherein the switch is ON when the first pulse signal is at a high level to make the capacitor of the voltage integrator to perform discharge; the switch being OFF when the first pulse signal is at a low level and the multiplier conversion signal charges the capacitor of the voltage integrator.

19. The multiplier-divider of claim 14, wherein the peak detector takes voltage sampling of an integration of the voltage integrator to form the first product signal by multiplying the multiplier conversion signal formed by the square wave generator and the first quotient signal.

20. The multiplier-divider of claim 1, wherein the second multiplication unit includes a peak detector and a voltage integrator.

21. The multiplier-divider of claim 20, wherein the peak detector includes a sampling switch, a capacitor and a comparator.

22. The multiplier-divider of claim 21, wherein the sampling switch has an ON period controlled by the second quotient signal output from the second division unit.

23. The multiplier-divider of claim 20, wherein the voltage integrator includes a capacitor and a switch, the capacitor being connected to the product conversion signal to be charged, ON and OFF of the switch being controlled by the second pulse signal.

24. The multiplier-divider of claim 23, wherein the switch is ON when the second pulse signal is at a low level to make the capacitor of the voltage integrator to perform discharge; the switch being OFF when the second pulse signal is at a high level and the product conversion signal charges the capacitor of the voltage integrator.

25. The multiplier-divider of claim 20, wherein the peak detector takes voltage sampling of an integration of the voltage integrator to form the output signal by multiplying the product conversion signal formed by the square wave generator and the second quotient signal.

26. The multiplier-divider of claim 1, wherein the first differential converter, the second differential converter and the third differential converter convert voltage to current.

27. The multiplier-divider of claim 1, wherein the second differential converter and the third differential converter have a same gain.

28. The multiplier-divider of claim 1, wherein the first differential converter has a gain $\pi/2$ times of the gain of the second differential converter and the third differential converter.

* * * * *